(12) United States Patent
Otosaka

(10) Patent No.: US 8,707,741 B2
(45) Date of Patent: Apr. 29, 2014

(54) METHOD OF MANUFACTURING OPTICAL FIBER PREFORM USING PLASMA TORCH

(75) Inventor: Tetsuya Otosaka, Gunma (JP)

(73) Assignee: Shin-Etsu Chemical Co., Ltd, Tokyo (JP)

( * ) Notice: Subject to any disclaimer, the term of this patent is extended or adjusted under 35 U.S.C. 154(b) by 22 days.

(21) Appl. No.: 12/843,699

(22) Filed: Jul. 26, 2010

(65) Prior Publication Data

US 2011/0016926 A1    Jan. 27, 2011

(30) Foreign Application Priority Data

Jul. 27, 2009    (JP) .................................. 2009-173975

(51) Int. Cl.
*C03B 37/018*    (2006.01)

(52) U.S. Cl.
USPC ................... 65/413; 65/414; 65/415; 65/416; 65/421

(58) Field of Classification Search
USPC .............................. 65/413, 414, 415, 416, 421
See application file for complete search history.

(56) References Cited

U.S. PATENT DOCUMENTS

| | | | |
|---|---|---|---|
| 4,402,720 A * | 9/1983 | Edahiro et al. ................... | 65/391 |
| 5,194,714 A | 3/1993 | Le Sergent | |
| 2002/0073737 A1 * | 6/2002 | Ooishi et al. ..................... | 65/382 |
| 2003/0070450 A1 * | 4/2003 | Nakamura et al. .............. | 65/377 |
| 2003/0182971 A1 | 10/2003 | Rebreyend et al. | |
| 2006/0207295 A1 * | 9/2006 | Huenermann ................... | 65/421 |
| 2008/0295541 A1 | 12/2008 | Otosaka | |

FOREIGN PATENT DOCUMENTS

| | | |
|---|---|---|
| CN | 1408662 A | 4/2003 |
| CN | 101314517 A | 12/2008 |
| DE | 10 2005 015706 A1 | 10/2006 |
| EP | 1 997 783 A2 | 12/2008 |
| JP | 63 248733 A | 10/1988 |
| JP | H02-47414 B2 | 10/1990 |
| JP | H04-79981 B2 | 12/1992 |
| JP | 2009-007242 A | 1/2009 |
| WO | 2006/106068 A2 | 10/2006 |

OTHER PUBLICATIONS

European Search Report dated Oct. 1, 2010, in a counterpart European patent application No. 10170807.1 for Examiner consideration.
First Office Action for Chinese Patent Application No. 201010245380.7, issued by the State Intellectual Property Office of the People's Republic of China on Oct. 29, 2013.

* cited by examiner

*Primary Examiner* — Queenie Dehghan

(57) ABSTRACT

A method of manufacturing an optical fiber preform by depositing glass fine particles onto a surface of a glass rod while the glass rod is reciprocated relative to a plasma torch, including: moving the glass rod in a first direction relative to the plasma torch while the plasma torch is applied to the glass rod and supplied at least with a dopant material and a glass material to deposit the glass fine particles onto the surface of the glass rod, in such a manner that a plasma power is set higher during a first time interval starting from a beginning of the movement of the glass rod in the first direction than during a second time interval starting from an end of the first time interval; and moving the glass rod in a second direction relative to the plasma torch, where the second direction is opposite to the first direction.

10 Claims, 2 Drawing Sheets

METHOD OF MANUFACTURING OPTICAL FIBER PREFORM USING PLASMA TORCH

CROSS REFERENCE TO RELATED APPLICATION

The contents of the following patent application are incorporated herein by reference, Japanese Patent Application No. 2009-173975 filed on Jul. 27, 2009.

BACKGROUND

1. Technical Field

The present invention relates to a method of manufacturing an optical fiber preform using a plasma torch such as a radio-frequency induction thermal plasma torch.

2. Description of the Related Art

A plasma torch such as a radio-frequency induction thermal plasma torch is structured by arranging a radio-frequency coil around a tube providing a gas channel and operated through application of a radio-frequency current to the coil to convert the gas in the tube into plasmas and to eject the plasmas. Such a plasma torch can achieve an ultrahigh temperature of approximately 10,000 degrees, provides a relatively low plasma linear speed, and allows the oxidizing/reducing atmosphere to be freely selected. Thus, such a plasma torch is used to provide an ultrahigh-temperature reaction medium.

An optical fiber that is structured such that a pure silica glass core is covered with a fluorine-doped silica glass cladding is characteristically highly ultraviolet- and radiation-resistant, when compared with a normally-used optical fiber that is structured such that a germanium-doped silica glass core is covered with a pure silica glass cladding. This is because the former has no Ge—O bonds, which have a low bonding energy.

There are some known methods for forming a fluorine-doped silica glass cladding on a glass core. A first method is disclosed, for example, in Examined Japanese Patent Publication No. 04-079981 and includes forming a porous glass layer around a pure silica glass rod by depositing pure silica glass fine particles and vitrifying the porous glass layer in a fluorine-containing atmosphere into a transparent glass. A second method is disclosed, for example, in Examined Japanese Patent Publication No. 02-047414 and includes directly depositing a transparent fluorine-doped silica glass around a pure silica glass rod with the use of a plasma flame.

The first method can only be used to achieve a relative refractive index difference up to approximately 0.7%, but exhibits excellent productivity and is suitable for forming a thick cladding layer. The second method is less productive than the first method, but can accomplish a relative refractive index difference higher than 0.7%.

The second method is now described with reference to FIG. 1.

A plasma torch 1 has a coil 2. When a radio-frequency power is applied to the coil 2, the gases supplied from a gas supply device 3 are converted into plasmas in the plasma torch 1 and the plasmas are ejected in a plasma flame 4. The gases include, for example, argon, oxygen, silicon tetrachloride, and a fluorine-containing gas (silicon tetrafluoride, hexafluoroethane, sulfur hexafluoride or the like).

In the plasma flame 4, fluorine-doped glass fine particles are produced and deposited onto the surface of a glass rod 6, which is rotated and reciprocated in the upward and downward directions in a reaction chamber 5. The glass fine particles that do not attach to the glass rod 6 and the waste gas are discharged outside through a gas outlet 7. In this manner, fluorine-doped glass thin-films are repeatedly deposited until an optical fiber preform having a cladding layer with a predetermined thickness is manufactured.

In the optical fiber preform manufactured in the above-described method, the relative refractive index difference disadvantageously varies in its longitudinal direction. This variation results from the varying refractive index of the cladding layer that is formed by the plasma depositing step since the refractive index of the core remains constant over the entire length. Furthermore, the optical fiber preform manufactured in the above-described method only achieves a low relative refractive index difference. This is because the temperature of the glass rod is not constant in its longitudinal direction during the depositing step.

To solve the above-mentioned problems, Japanese Patent Application Publication No. 2008-134585 discloses a method according to which the depositing step is carried out while the glass rod is moved in a first direction (for example, in the downward direction) but suspended while the glass rod is moved in a second direction opposite to the first direction (for example, in the upward direction). While the glass rod is moved in the second direction, the plasma torch is supplied with a lower power and the glass rod is moved faster than while the glass rod is moved in the first direction, for the purpose of suppressing the rise in the temperature of the glass rod. According to this method, the temperature of the glass rod remains substantially constant in the longitudinal direction during the depositing step. Consequently, the relative refractive index difference remains constant over the entire length of the resulting optical fiber preform.

According to the method disclosed in Japanese Patent Application No. 2008-134585 in which the deposition of the glass fine particles is carried out while the glass rod is moved in the first direction or downwards and the deposition is suspended while the glass rod is moved in the second direction or upwards, the deposited glass layer does not have a smooth surface in a lower portion of the glass rod (a portion having a predetermined length from the end of the glass rod at which the deposition starts) and may have a rough surface. The length of the rough-surface portion varies depending on the shape of the end of the glass rod, and may range from approximately 20 to 60 mm with respect to the lower end of the glass rod (the end of the glass rod at which the deposition starts), for example, when the glass rod has a diameter of 50 mmφ. Such a rough-surface portion corresponding to the lower portion of the glass rod cannot be used as an optical fiber base material. Accordingly, the above-mentioned method has a problem of a low yield.

If a higher power is supplied to the plasma torch to reduce the roughness, the fluorine doping amount decreases in the straight portion, which results in a lower relative refractive index difference and thus in poorer optical characteristics. This is because, as disclosed in Japanese Patent Application No. 2008-134585, the temperature of the glass rod is interrelated with the fluorine doping amount, specifically speaking, as the temperature of the glass rod increases, the fluorine doping amount decreases.

SUMMARY

Therefore, it is an object of an aspect of the innovations herein to provide a method of manufacturing an optical fiber preform that stably maintains a high relative refractive index difference in its longitudinal direction without allowing a glass layer deposited on a glass rod to have a rough surface in a lower portion. The above and other objects can be achieved by combinations described in the independent claims. The dependent claims define further advantageous and exemplary combinations of the innovations herein.

According to an aspect related to the innovations herein, one exemplary method of manufacturing an optical fiber preform may include depositing glass fine particles onto a surface of a glass rod while the glass rod is reciprocated relative to a plasma torch. The method includes moving the glass rod in a first direction relative to the plasma torch while the plasma torch is applied to the glass rod and supplied at least with a dopant material and a glass material to deposit the glass fine particles onto the surface of the glass rod, in such a manner that a plasma power is set higher during a first time interval starting from a beginning of the movement of the glass rod in the first direction than during a second time interval starting from an end of the first time interval, and moving the glass rod in a second direction relative to the plasma torch, where the second direction is opposite to the first direction.

According to the method of the present invention, the surface of the optical fiber preform corresponding to the lower end portion of the glass rod is prevented from being rough due to an insufficient temperature. Furthermore, the optical fiber preform manufactured by using the method of the present invention stably maintains a constant relative refractive index difference in its longitudinal direction. Thus, the method of the present invention can significantly improve the yield of the optical fiber preform.

DESCRIPTION OF EXEMPLARY EMBODIMENTS

The inventor of the present invention thoroughly reviewed the conventional method disclosed in Japanese Patent Application No. 2008-134585.

When a cladding layer is formed by depositing glass fine particles around a glass rod, the ends of the glass rod may not tapered, or the reciprocation may be limited so that a flame is only applied to the straight portion of the glass rod. In such cases, however, thermal stress may be disadvantageously induced within the glass rod, and the glass rod may break during the depositing step. To prevent this, the ends of the glass rod are tapered and the glass rod, including its ends, is heated by the flame.

Figure 1:
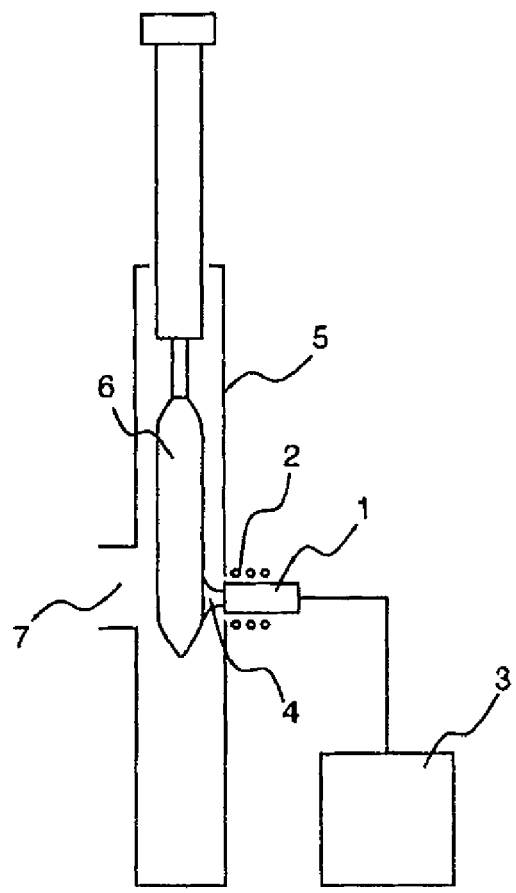
FIG. 1 schematically illustrates how to deposit a cladding layer onto a glass rod by using a plasma torch.
Figures 2A, 2B, 2C, 2D, 2E:
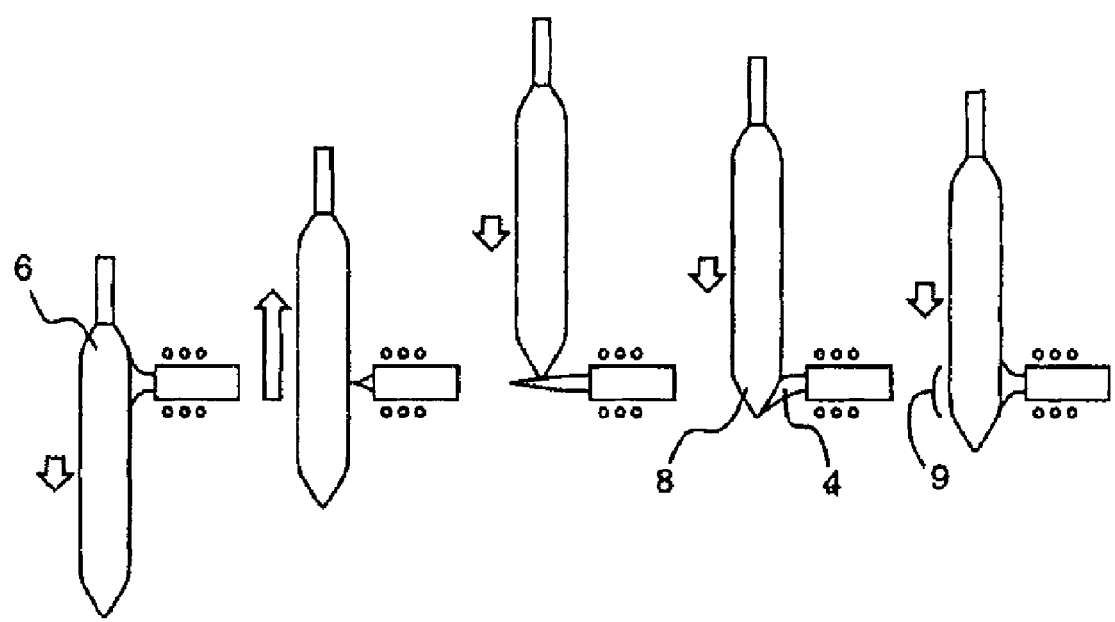
FIG. 2A schematically illustrates the state of a plasma flame that is applied to a glass rod while the glass rod is moved downwards.
FIG. 2B schematically illustrates the state of the plasma flame that is applied to the glass rod while the glass rod is moved upwards.
FIG. 2C schematically illustrates the state of the plasma flame that is applied to the glass rod while the glass rod is moved downwards.
FIG. 2D schematically illustrates the state of the plasma flame that is applied to the glass rod while the glass rod is moved downwards.
FIG. 2E schematically illustrates the state of the plasma flame that is applied to the glass rod while the glass rod is moved downwards.

The state of the plasma flame is now described. When the glass rod 6 reaches the lowest portion of the reaction chamber as shown in FIG. 2A, the plasma power is lowered as shown in FIG. 2B and the glass rod is rapidly lifted. Subsequently, when the glass rod reaches the highest portion of the reaction chamber, the rapid-lifting/low-power upward movement is switched to the slow-lowering/high-power downward movement and the raw materials start to be supplied, as shown in FIG. 2C. During the initial phase of the downward movement, the top of the plasma flame 4 flows downward along the tapered lower end 8 of the glass rod as shown in FIG. 2D. The plasma flame 4 remains in this state until the center of the flame flow reaches the vicinity of the highest part of the tapered lower end. After this, when the glass rod is lowered sufficiently so that the entire flame flow becomes applied to the straight portion of the glass rod as shown in FIG. 2E, the flame flow is substantially evenly divided vertically. Therefore, the lower part 9 of the straight portion of the glass rod is placed in the flame flow for a shorter period of time than the middle part of the straight portion of the glass rod, and thus does not experience a sufficient temperature rise.

The inventor of the present invention discovered that the lower part of the straight portion of the glass rod may be heated to a sufficiently high temperature by adjusting the plasma power during the downward movement of the glass rod in such a manner that the plasma power becomes higher during a first time interval at the beginning of the downward movement of the glass rod than during a second time interval (hereinafter, referred to as the stated state) after the first time interval, and realized the present embodiment.

The present embodiment is characterized by adjusting the plasma power during the downward movement of the glass rod such that the plasma power becomes higher for a first time interval from the beginning of the downward movement of the glass rod than during the subsequent steady state.

The depositing step was carried out by varying the length of the first time interval from the beginning of the downward movement of the glass rod during which the plasma power is set higher than during the steady state. The relative refractive index difference of the manufactured optical fiber preform was measured. The measured results indicated that the first time interval from the beginning of the downward movement of the glass rod during which the plasma power is set higher should be defined as a time interval from when the plasma torch was applied to the lower end of the glass rod at which the deposition starts to when the plasma torch was moved away from the lower end of the glass rod by a distance of 70 to 90 mm, more preferably, 80 to 90 mm. When the first time interval was defined as a time interval from when the plasma torch was applied to the lower end of the glass rod at which the deposition starts to when the plasma torch was moved away from the lower end by a distance of less than 70 mm, the Δ value at the middle of the glass rod and the Δ value at the lower end of the glass rod were too small and did not satisfy the product requirements. Here, the Δ value refers to the relative refractive index difference that is calculated by the following equation.

$$\Delta = (n_1^2 - n_2^2)/2n_1^2 \approx (n_1 - n_2)/n_1$$

In the equation, $n_1$ denotes the refractive index of the core and $n_2$ denotes the refractive index of the cladding. When the first time interval was defined as a time interval from when the plasma torch was applied to the lower end of the glass rod at which the deposition starts to when the plasma torch was moved away from the lower end by a distance of 70 to 80 mm, the Δ value at the middle of the glass rod and the Δ value at the lower end of the glass rod varied from each other but fell in an acceptable range. When the first time interval was defined as a time interval from when the plasma torch was applied to the lower end of the glass rod at which the deposition starts to when the plasma torch was moved away from the lower end by a distance of 80 to 90 mm, the value at the middle of the glass rod and the Δ value at the lower end of the glass rod were excellently adequate and did not vary from each other. When the first time interval was defined as a time interval from when the plasma torch was applied to the lower end of the glass rod at which the deposition starts to when the plasma torch was moved away from the lower end by a distance of 90 mm or more, the Δ value at the middle of the glass rod and the Δ value at the lower end of the glass rod significantly varied from each other and did not meet the product standards.

In the above example, the plasma power is set higher during the time interval from when the plasma torch is applied to the lower end of the glass rod at which the deposition starts to when the plasma torch is moved away from the lower end by a distance of 70 to 90 mm. However, the plasma power may be alternatively set higher during a time interval from when the plasma torch is applied to the lower end of the glass rod at which the deposition starts to when the plasma torch is moved away from the lower end by a distance equal to the product of the diameter of the plasma torch and 0.8 to 2.0 or a distance equal to the product of the diameter of the glass rod and 0.8 to 2.0, or a distance equal to the product of a smaller one of the torch diameter and the glass rod diameter and 0.8 to 2.0.

Note that the above-stated measurement results were obtained from preforms whose straight portion had a diameter of 100 mm and a length of 1500 mm and that a burner whose diameter (the diameter of the discharge port) was 50 mm was used.

The length of the time interval during which the plasma power is set higher at the beginning of the downward movement of the glass rod than during the subsequent steady state varies depending on the outer diameter of the glass rod, the shape of the tapered ends, the size of the plasma flame and other factors, but may be determined taking into consideration the range of the rough-surface portion formed on the glass rod which may be created unless the plasma power is set higher at the beginning of the downward movement of the glass rod. In this case, the time interval is also preferably from when the plasma torch is applied to the lower end of the glass rod to when the plasma torch is moved away from the lower end by a distance equal to the product of the outer diameter of the glass rod and 0.5 to 2. If the time interval lasts until the plasma torch is moved away from the lower end by a distance less than the product of the outer diameter of the glass rod and 0.5, the lower end of the glass rod is not heated to a sufficiently high temperature and the surface roughness cannot be reduced. If the time interval lasts until the plasma torch is moved away from the lower end by a distance more than the product of the outer diameter of the glass rod and 2, the relative refractive index difference varies in the longitudinal direction.

The degree by which the plasma power is increased at the beginning of the downward movement of the glass rod when compared with the subsequent steady state varies depending on the outer diameter of the glass rod, the shape of the tapered ends, the size of the plasma flame and other factors, but sufficient effects can be produced by increasing the plasma power at the beginning of the downward movement of the glass rod by approximately 1 to 5% when compared with the steady state. If the plasma power is increased by more than 5%, the relative refractive index difference becomes lower at the lower end of the glass rod. If the plasma power is increased by less than 1%, the surface roughness cannot be sufficiently reduced.

EXEMPLARY EMBODIMENT

The following describes the present invention in more details with reference to exemplary embodiments and comparative examples. The present invention, however, is not limited to such and can be embodied in may other ways.

First Exemplary Embodiment

A fluorine-doped quartz glass layer was deposited onto a quartz glass rod having an outer diameter of 50 mm and a length of 1100 mm by using a radio-frequency induction thermal plasma torch having an inner diameter of 42 mm. The lower end of the glass rod was tapered and had a length of 60 mm.

While the glass rod was moved downwards, the relative movement speed between the plasma torch and the target was set at 75 mm/min, and the plasma torch was supplied with argon, oxygen, silicon tetrachloride and sulfur hexafluoride. When applied to the straight portion of the glass rod, the plasma torch was supplied with a power of 48 kW. At the beginning of the downward movement of the glass rod, the power supplied to the plasma torch was set at 50 kW, which is 2 kW higher than the power supplied to the plasma torch when the plasma torch is applied to the straight portion of the glass rod, until the plasma torch was moved away from the lower end of the glass rod at which the deposition starts by a distance of 90 mm.

While the glass rod was moved upwards, the relative movement speed between the plasma torch and the target was set at 500 mm/min, and the plasma torch was supplied with argon and oxygen but not with silicon tetrachloride and sulfur hexafluoride, which respectively form glass fine particles and provides fluorine. While the glass rod was moved upwards, the power supplied to the plasma torch was set at 8 kW, which is the lowest power with which the plasmas were stably maintained.

Under the above-mentioned conditions, the relative movement was repeatedly performed 50 times (50 cycles of the upward and downward movements) to deposit the fluorine-doped glass layer onto the quartz glass rod. Consequently, an optical fiber preform was manufactured.

The manufactured preform had an excellent surface at its lower end. Specifically speaking, the lower end of the manufactured preform had a smooth surface and was formed by a transparent glass. The refractive index distribution was measured by using a preform analyzer to determine the longitudinal relative refractive index difference distribution. The result indicated that the relative refractive index difference was substantially the same, specifically speaking 1.4%, at both the middle of the glass rod and the lower end of the glass rod. Out of the 1040-mm-long portion excluding the tapered portion, the top 50-mm-long portion did not have a sufficient amount of glass particles, but the remaining 990-mm-long portion was acceptable as an optical fiber preform. The acceptance ratio was 95.2%.

First Comparative Example

A fluorine-doped quartz glass layer was deposited onto a quartz glass rod having an outer diameter of 50 mm and a length of 1100 mm by using a radio-frequency induction thermal plasma torch having an inner diameter of 42 mm. The lower end of the glass rod was tapered and had a length of 60 mm.

While the glass rod was moved downwards, the relative movement speed between the plasma torch and the target was set at 75 mm/min, and the plasma torch was supplied with argon, oxygen, silicon tetrachloride and sulfur hexafluoride. When applied to the straight portion of the glass rod, the plasma torch was supplied with a power of 48 kW. Even until the plasma torch was moved away from the lower end of the glass rod at which the deposition starts by a distance of 90 mm, the power supplied to the plasma torch was set at 48 kW, which is the same as the power supplied to the plasma torch when the plasma torch is applied to the straight portion.

The conditions applied while the glass rod was moved upwards, such as the relative movement speed between the plasma torch and the target, and the power and gasses supplied to the plasma torch, were set the same as in the first exemplary embodiment.

Under the above-mentioned conditions, the relative movement was repeatedly performed 50 times (50 cycles of the upward and downward movements) to deposit the fluorine-doped glass layer onto the quartz glass rod. Consequently, an optical fiber preform was manufactured.

The portion of the manufactured preform that is 40 mm long from the lower end of the straight portion had a rough surface and was formed by a slightly less transparent glass. The refractive index distribution was measured by using a preform analyzer to determine the longitudinal relative refractive index difference distribution. The result indicated that the portion that is 50 mm long from the lower end of the glass rod had a higher relative refractive index difference of up to 1.52% than the relative refractive index difference of the middle portion of the glass rod, which was 1.4%. Out of the 1040-mm-long portion excluding the tapered portion, the top 50-mm-long portion was rejected due to an insufficient amount of glass particles and the bottom 40-mm-long portion was rejected due to the rough surface, but the remaining 950-mm-long portion was acceptable as an optical fiber preform. The acceptance ratio was 91.3%.

Second Comparative Example

A fluorine-doped quartz glass layer was deposited onto a quartz glass rod having an outer diameter of 50 mm and a length of 1100 mm by using a radio-frequency induction thermal plasma torch having an inner diameter of 42 mm. The lower end of the glass rod was tapered and had a length of 60 mm.

While the glass rod was moved downwards, the relative movement speed between the plasma torch and the glass rod was set at 75 mm/min, and the plasma torch was supplied with argon, oxygen, silicon tetrachloride and sulfur hexafluoride. When applied to the straight portion of the glass rod, the plasma torch was supplied with a power of 50 kW. Even until the plasma torch was moved away from the lower end of the glass rod at which the deposition starts by a distance of 90 mm, the power supplied to the plasma torch was set at 50 kW, which is the same as the power supplied to the plasma torch when the plasma torch is applied to the straight portion.

The conditions applied while the glass rod was moved upwards, such as the relative movement speed between the plasma torch and the glass rod, and the power and gasses supplied to the plasma torch, were set the same as in the first exemplary embodiment.

Under the above-mentioned conditions, the relative movement was repeatedly performed 50 times (50 cycles of the upward and downward movements) to deposit the fluorine-doped glass layer onto the quartz glass rod. Consequently, an optical fiber preform was manufactured.

The manufactured preform had an excellent surface at its lower end. Specifically speaking, the lower end of the manufactured preform had a smooth surface and was formed by a transparent glass. The refractive index distribution was measured by using a preform analyzer to determine the longitudinal relative refractive index difference distribution. The result indicated that the portion corresponding to the lower end portion of the glass rod had an excellent relative refractive index difference of 1.4% but the remaining portion corresponding to the straight portion of the glass rod had a relative refractive index difference of 1.3%, which is lower than the value measured in the first exemplary embodiment.

The method relating to the present invention can provide, at a high yield, optical fiber preforms whose relative refractive index difference stably remains constant in its longitudinal direction, thereby reducing the cost.

What is claimed is:

1. A method of manufacturing an optical fiber preform by depositing glass fine particles onto a surface of a glass rod having two tapered ends while the glass rod is reciprocated relative to a plasma torch, the method comprising:
   determining a distance by multiplying a number within a range of 0.5 to 2 and an outer diameter of the glass rod;
   moving the glass rod in a first direction relative to the plasma torch while the plasma torch is applied to the glass rod and supplied at least with a dopant material and a glass material to deposit the glass fine particles onto the surface of the glass rod, in such a manner that duration of the movement of the glass rod in the first direction includes a first time interval and a second time interval, the first time interval starting from a beginning of the movement of the glass rod in the first direction at which the plasma torch is applied to one of the ends of the glass rod and continuing until the plasma torch is relatively moved away from the one of the ends of the glass rod by the determined distance, the second time interval starting from an end of the first time interval, and a plasma power is set higher during the first time interval than during the second time interval; and
   moving the glass rod in a second direction relative to the plasma torch, the second direction being opposite to the first direction.

2. The method as set forth in claim 1, wherein the first time interval continues at least until a tapered portion of the one of the ends of the glass rod to which the plasma torch is applied passes the plasma torch.

3. The method as set forth in claim 2, wherein
   the first time interval continues until the plasma torch is relatively moved away from the one of the ends of the glass rod by a distance of 70 to 90 mm.

4. The method as set forth in claim 3, wherein
   the first time interval continues until the plasma torch is relatively moved away from the one of the ends of the glass rod by a distance of 80 to 90 mm.

5. The method as set forth in claim 1, wherein
   the dopant material and the glass material are not supplied to the plasma torch while the glass rod is moved in the second direction.

6. The method as set forth in claim 1, wherein
   the plasma power is set higher while the glass rod is moved in the first direction than while the glass rod is moved in the second direction.

7. The method as set forth in claim 1, wherein
   a movement speed of the glass rod relative to the plasma torch is slower while the glass rod is moved in the first direction than while the glass rod is moved in the second direction.

8. The method as set forth in claim 1, wherein the glass rod is rotated while being moved in the first and second directions.

9. The method as set forth in claim 1, wherein the plasma torch is also applied to the glass rod while the glass rod is moved in the second direction.

10. The method as set forth in claim 1, wherein the plasma power is set approximately 1 to 5% higher during the first time interval than during the second time interval.

* * * * *